United States Patent [19]

Han

[11] Patent Number: 5,372,268

[45] Date of Patent: Dec. 13, 1994

[54] PULL TAB INNERSEAL

[75] Inventor: Hak-Rhim Han, St. Paul, Minn.

[73] Assignee: Minnesota Mining and Manufacturing, St. Paul, Minn.

[21] Appl. No.: 865,691

[22] Filed: Apr. 8, 1992

Related U.S. Application Data

[63] Continuation of Ser. No. 549,539, Jul. 9, 1990, abandoned, which is a continuation-in-part of Ser. No. 382,859, Jul. 20, 1989, abandoned.

[51] Int. Cl.$^5$ ............................................. B65D 51/20
[52] U.S. Cl. ................................... 215/232; 215/349; 220/359
[58] Field of Search ............... 215/232, 305, 359, 349; 220/359; 229/125.33, 125.34, 125.35

[56] References Cited

U.S. PATENT DOCUMENTS

| | | | |
|---|---|---|---|
| 3,154,461 | 10/1964 | Johnson . | |
| 3,342,657 | 9/1967 | Dyer . | |
| 3,767,076 | 10/1973 | Kennedy | 215/232 |
| 4,047,473 | 9/1977 | Fletcher et al. . | |
| 4,155,439 | 5/1979 | Fletcher et al. . | |
| 4,209,126 | 6/1980 | Elias | 215/232 X |
| 4,243,463 | 1/1981 | Gash . | |
| 4,264,316 | 4/1981 | Knudsen . | |
| 4,266,687 | 5/1981 | Cummings | 215/232 |
| 4,327,147 | 4/1982 | Ou-Yang . | |
| 4,390,552 | 6/1983 | Niwa | 215/232 |
| 4,396,655 | 8/1983 | Graham et al. | 215/232 X |
| 4,423,819 | 1/1984 | Cummings | 215/232 |
| 4,501,371 | 2/1985 | Smalley | 220/359 |
| 4,579,240 | 4/1986 | Ou-Yang | 215/232 X |
| 4,588,099 | 5/1986 | Diez | 215/232 |
| 4,588,465 | 5/1986 | Paciovek | 215/232 X |
| 4,596,338 | 6/1986 | Yousif | 215/232 |
| 4,625,875 | 12/1986 | Carr et al. . | |
| 4,693,390 | 9/1987 | Hekal | 220/359 |
| 4,722,447 | 2/1988 | Crisci . | |
| 4,733,786 | 3/1988 | Emslander | 215/232 X |
| 4,754,890 | 7/1988 | Ullman et al. | 215/232 |
| 4,757,914 | 7/1988 | Roth et al. | 220/359 |
| 4,771,935 | 9/1988 | Hekal | 229/125.35 |
| 4,778,698 | 10/1988 | Ou-Yang | 215/232 X |
| 4,890,758 | 1/1990 | Gailus | 220/359 |

FOREIGN PATENT DOCUMENTS 1414785  11/1975  United Kingdom .
1577128  10/1980  United Kingdom .

Primary Examiner—Allan N. Shoap
Assistant Examiner—Vanessa Caretto
Attorney, Agent, or Firm—Gary L. Griswold; Walter N. Kirn; David L. Weinstein

[57] ABSTRACT

A reinforced sheet material suitable for making innerseals and sealing membranes for containers. The sheet material comprises a layer of sealing material for bonding the sheet to a container, a layer of material substantially impermeable to air and moisture, and a reinforcing layer comprising at least two plies of monoaxially oriented film combined in lamination with the strong direction of at least one ply crossing the weak direction of another ply. Tabbed innerseals made from the sheet material of this invention exhibit less springback than do tabs of conventional tabbed innerseals. The invention also includes innerseals and sealing membranes made from the aforementioned sheet material and containers utilizing these innerseals and sealing membranes.

10 Claims, 3 Drawing Sheets

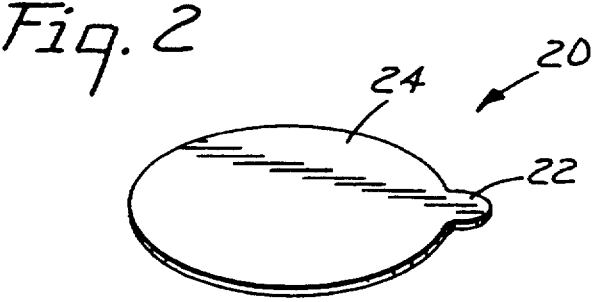
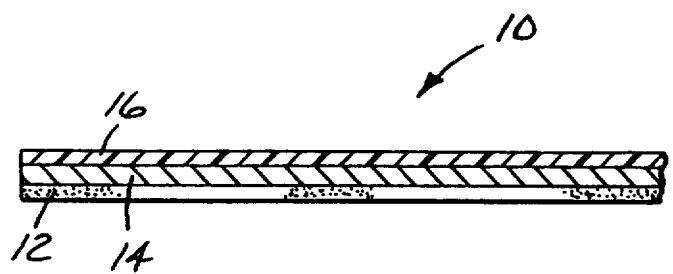
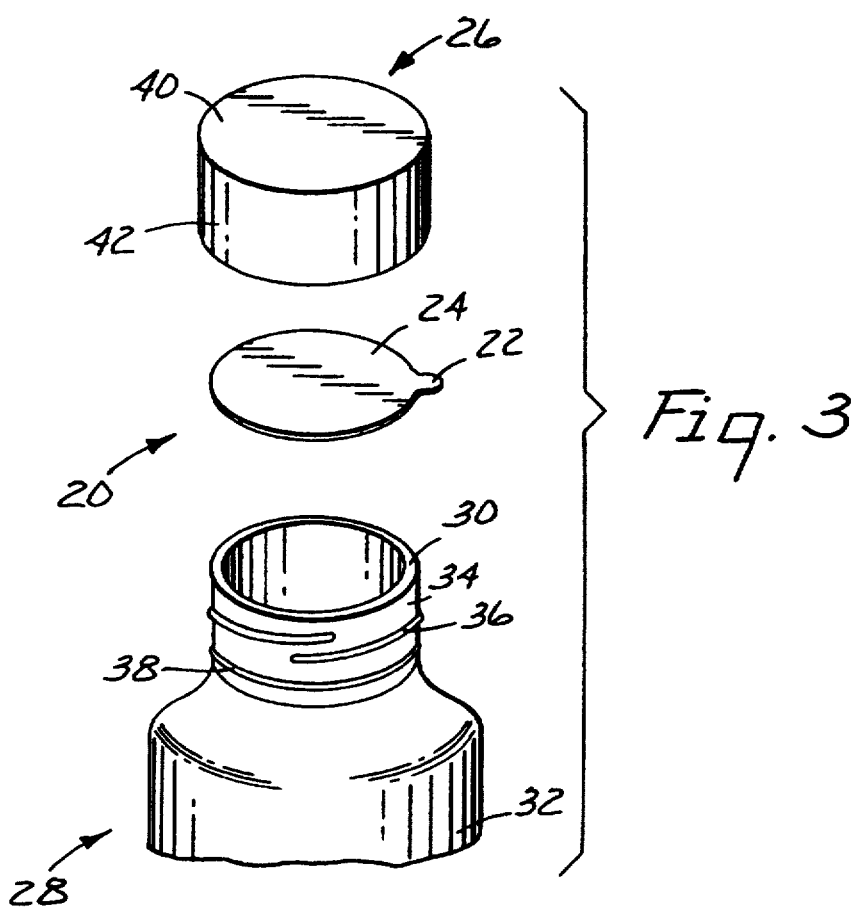

PULL TAB INNERSEAL

This is a continuation of application Ser. No. 07/549,539 filed Jul. 9, 1990, now abandoned, which is a continuation-in-part of application Ser. No. 07/382,859, filed Jul. 20, 1989, now abandoned.

BACKGROUND OF THE INVENTION

1. Field of the Invention

This invention relates to containers, and, in particular, to multi-layer sheet materials for sealing containers.

2. Discussion of the Prior Art

Sheets of multi-layered materials have been used to prepare innerseals to seal the openings of containers from air and contaminants. A simple innerseal consists of a sheet of metal foil bearing a layer of heat sealable material for bonding the foil to the lip of a container, for example, a bottle. Innerseals are typically die-cut from sheets of a multi-layered material and sealed by means of heat to the lip of the container.

Innerseals can be constructed to have a tab that extends outwardly from the periphery of the innerseal so that a user can grasp the tab to aid in removing the innerseal from the container.

An innerseal having a tab is typically employed with a container having a threaded neck, which container employs a threaded cap. The innerseal is die-cut from the aforementioned multi-layered sheet of metal foil bearing a layer of heat sealable material. The tab is folded 180° so that it can fit within the cap but still be in such a position that it can later be used to peel the sealed innerseal off the lip of the container. The innerseal is then inserted into the cap, and the cap is twisted onto the neck of the container. The capped container is then heated by means of induction to heat the aluminum foil and thereby melt the layer of heat sealable material so that the innerseal will be bonded to the container. Innerseals having tabs can also be used with containers that employ snap-on caps.

U.S. Pat. Nos. 4,047,473 and 4,155,439 describe a method and apparatus for applying sealing membranes having a folded pull tab to containers. The patents describe the apparatus for die-cutting the sealing membranes from a sheet, folding the tab, and inserting the sealing membranes into an overcap. The overcap assembly is then placed on the container, tightened, and the sealing membrane is sealed to the container.

U.S. Pat. No. 4,754,890 describes a tamper evident safety seal having a tab that consists of a sheet material that is folded in a Z or S configuration to form a double folded tab. The safety seal can also include a scrim to provide additional strength.

U.S. Pat. No. 4,625,875 describes a tamper evident safety seal that includes a cap and a sealing disc having a tab.

Although sealing membranes, safety seals, sealing discs, and innerseals having tabs for easy removal are known in the art, the tab may have certain deficiencies that prevent innerseals having tabs from receiving widespread acceptance in the marketplace. When the innerseal is die-cut, the edge of the innerseal adjacent to the tab can become nicked, so that when the user pulls on the tab, only a portion of the innerseal may be removed. If the innerseal has poor internal strength, when the tab is pulled, only a narrow strip of innerseal material, having a width substantially the same as the width of the tab, is removed. In some cases, the tab can be pulled off without removing any part of the innerseal.

Another problem encountered with innerseals currently used in the marketplace is referred to herein as springback. In most conventional innerseals, after the tab is folded to allow insertion of the innerseal in the cap, the tab springs back about 90° so that rather than laying flat against the portion of the innerseal covering the mouth of the container, it extends roughly perpendicular to the plane of the innerseal. After the innerseal is inserted into the cap, springback of the tab can push the innerseal out of the cap and cause it to be misaligned during sealing so that an inadequate seal is formed. Springback of the tab can also cause the innerseal to fall out of the cap, resulting in an unsealed container.

It would be desirable to provide an innerseal having high internal strength and further having a tab that exhibits springback of less than about 45° from the plane of the innerseal once the tab is folded against the portion of the innerseal covering the mouth of the container. As stated previously, conventional innerseals typically spring back about 90° from the plane of the innerseal.

SUMMARY OF THE INVENTION

In one aspect, the present invention provides a multi-layered sheet material and a seal for containers formed from the sheet material. The sheet material exhibits increased strength, improved tear resistance, and less springback when the material is doubled over itself when compared to sheet material currently available. In another aspect, the invention provides a multi-layered seal having a tab for use with a container.

The seal of this invention is formed of a sheet material comprising (a) a layer of sealing material for bonding the seal to the container, (b) a layer that is substantially impermeable to air and moisture, and (c) a layer of reinforcing material. The layer of sealing material can be formed from any suitable adhesive, such as, for example, a heat sealable film, a hot melt adhesive, a tack-free pressure-activated adhesive, or a shear-activated adhesive. The impermeable layer can be formed from polymeric film, e.g., poly(vinyl chloride), or metal foil, e.g., aluminum foil. The reinforcing layer is a multi-ply film consisting of at least two plies of monoaxially oriented films that are laminated together with the strong direction of one ply crossing the weak direction of another ply to impart equal strength in all directions such that the tear and tensile strengths are increased in the machine direction, the cross direction, and in a diagonal direction.

The sheet material of this invention can be used to make innerseals for containers. The sheet material is particularly useful for making innerseals having tabs. The material of the reinforcing layer prevents the folded tab from springing back more than about 45°, thereby eliminating the problems of misalignment of the innerseal after it has been placed in the cap or falling out of the innerseal from the cap. The sheet material of this invention can also be used to make sealing membranes for containers, which sealing membranes do not require the use of caps.

BRIEF DESCRIPTION OF THE DRAWINGS

FIG. 1 is a greatly enlarged, schematic, cross-sectional view of a standard material from which an innerseal or sealing membrane can be formed.

FIG. 2 is a perspective view of one embodiment of an innerseal of this invention. In this embodiment, the innerseal has a tab.

FIG. 3 is an exploded perspective view showing a bottle with the innerseal of FIG. 2

DETAILED DESCRIPTION

Figure 4A:
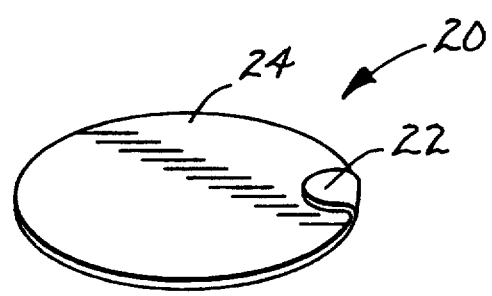
FIG. 4A is a perspective view of the embodiment of FIG. 2 in which the tab is folded back 180°.

Referring now to FIG. 1, a sheet material 10 suitable for preparing innerseals and sealing membranes in general for sealing containers from air and contaminants comprises: (a) a layer of sealing material 12 for bonding the innerseal or sealing membrane to a container, (b) a layer of material impermeable to air and moisture 14, and (c) a layer of reinforcing material 16.

The layer of sealing material 12 can be any suitable sealing material, such as, for example, a heat sealable film, a hot melt adhesive, a tack-free pressure activated adhesive, or the like. Heat sealable films suitable for this invention include polyethylene, polypropylene, ethylene-vinyl acetate copolymer, modified polyester, and the like. The choice of heat sealing material depends upon the composition of the container to be sealed. Generally, the heat sealable material should be similar to the material from which the container is made. Containers made of polyethylene can be sealed with films or hot melt adhesives made of polyethylene or ethylene vinyl acetate copolymers. Containers made of polypropylene can be sealed with films or hot melt adhesives made of polypropylene or ethylene vinyl acetate copolymers. Containers made of polyester and poly(vinyl chloride) can be sealed with modified heat sealable polyesters or acrylonitrile rubbers. Other sealing materials include ionomer resins available from E. I. DuPont de Nemours and Company, Wilmington, Del., and marketed under the trademark "Surlyn".

Representative examples of commercially available films suitable for sealing layer 12 include "Scotchpak" films available from Minnesota Mining and Manufacturing Company of St. Paul, Minn., "Mylar" 50 OL-2 film, and "Mylar" 50 XM946 film, the latter two available from E. I. DuPont de Nemours and Company, Wilmington, Del.

The impermeable layer 14 can be a metallic foil, such as an aluminum foil, or a polymeric material, such as a poly(vinyl chloride), a polyester, or a multi-layer film, e.g., a laminate of poly(vinyl chloride) and polyester.

The layer of reinforcing material 16 is a multi-layered film which has at least two plies of monoaxially oriented films laminated in such a manner so as to improve the tear strength and tensile strength of the sheet in the machine direction, the cross direction, and the diagonal direction. When two plies are used, they are combined in lamination with the strong direction of one ply crossing the weak direction of the other ply, so that equal strength is imparted in all directions. The plies of the laminate may be formed of the same or different polymers. Suitable thermoplastic polymers for the plies of the laminate are, for example, homo- and co-polymers of ethylene, polypropylene, polystyrene, poly(vinyl chloride), polyvinylidene chloride, polyvinyl alcohol, and ethylene/vinyl acetate copolymers. Polyesters can also be used to prepare plies of the laminate. The most preferred layer materials are polypropylene and high density polyethylene. The plies can be laminated together by conventional means, such as heat sealing, sonic welding, or by the use of laminating adhesives. A representative example of a commercially available film suitable for the reinforcing material of this invention is sold under the trademark "Valeron", and is available from Van Leer Plastics, Inc., Houston, Tex. Methods of making such reinforcing materials are described in U.S. Pat. Nos. 3,342,657 and 4,243,463, and British Patent Specification Nos. 1,577,128, and 1,414,785, all of which are incorporated herein by reference. The thickness of layer of reinforcing material 16 preferably ranges from about 2 mils to about 12 mils (about 0.05 mm to about 0.30 mm). Because layer of reinforcing material 16 is relatively thin, a tab extending from the periphery thereof can be folded over layer 16 without adversely affecting the fit of an innerseal within the cap of a container.

U.S. Pat. No. 4,243,463 discloses thermoplastic polymeric film laminates which comprise two or more substantially monoaxially oriented layers, the directions of orientation of each layer being at an angle, preferably 45°, to the longitudinal dimension of the laminate and being at an angle, preferably 90°, to the direction of orientation of the adjacent layer(s). Such laminates are commonly referred as "cross-laminates". The layers of such cross-laminates can be bonded together in any suitable way, for example, by adhesive, spot-welding, or by extrusion lamination (that is, the extrusion of a thin film of molten polymer between converging pre-formed films in the nip of a pair of nip rolls in which the laminate is formed). The production of cross-laminates is described, for example, in British Patent Specification No. 1,414,785.

Reinforcing layer 16 functions to reinforce the innerseal. Reinforcing layer 16 can be disposed between impermeable layer 14 and sealing layer 12 (FIG. 5) or impermeable layer 14 can be disposed between reinforcing layer 16 and sealing layer 12 (FIG. 1). For an innerseal having a tab, it is preferred that impermeable layer 14 be disposed between reinforcing layer 16 and sealing layer 12. The preferred construction provides significantly less springback of the tab after the tab has been folded. Moreover, if impermeable layer 14 is made of a metallic foil, induction heating will require less energy when impermeable layer 14 is in contact with sealing layer 12.

The surprising feature of this invention is that reinforcing layer 16 causes a folded portion of sheet 10 to spring back less than do multi-layered sheets known in the art. While one would expect that a reinforcing layer would resist folding and would have a tendency to spring back to its original unfolded configuration, reinforcing layer 16 can be folded easily and resists springback quite effectively. In conventional tabbed innerseals, i.e., tabbed innerseals made from oriented polymeric films, when the tab is folded across the direction of orientation of the polymeric film, the innerseal is nowhere near as effective as the innerseal of the present invention.

Layers 12, 14, and 16 can be bonded together either by means of heat sealing or by means of suitable laminating adhesives. An example of a laminating adhesive suitable for this invention is a urethane-based adhesive having the trade designation "Adcote" 503A, available from Morton Thiokol, Inc., Chicago. Ill.

Figure 6:
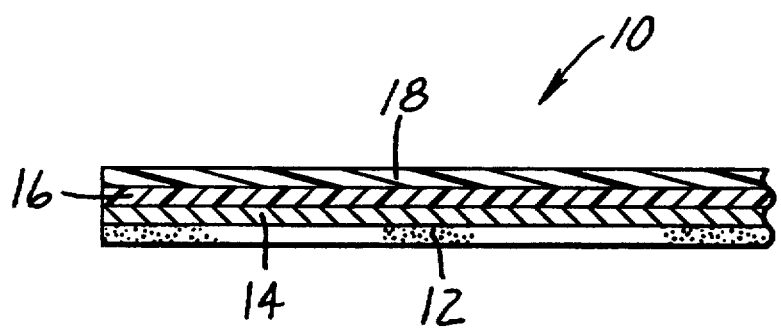

Other layers can be included with the previously described sheet material 10 to provide increased bulk, improved appearance, a surface for additional reinforcement, and a surface for printing. Materials that can be used for additional layers include papers, polymeric films, nonwovens, silk screen inks, and the like. Such a layer is shown in FIG. 6 and is designated by the reference number 18.

Innerseals utilizing the sheet material of the present invention can be die-cut from the sheet material and applied to a container by means that are known and will not be described in detail here. Briefly, referring to FIGS. 1, 2, and 3, an innerseal 20 having a tab 22 and a portion 24 that covers the mouth of a container is die-cut to the desired shape from the sheet material 10 (see FIG. 1) of this invention. Tab 22 is folded such that the surface thereof not bearing sealing material comes into contact with the surface of portion 24 not bearing sealing material. Innerseal 20 is then placed in a cap 26 that is to be applied to a container 28. Innerseal 20 is disposed in cap 26 such that the sealing layer (i.e., layer 12 of FIG. 1) is disposed to contact the lip 30 of container 28. Container 28 can be a conventional bottle, typically formed of either plastic or glass, and having a body portion 32 and a neck 34 defining at its upper end the container mouth and having an external thread 36 and a circumferential bead 38. Cap 26 may also be of conventional construction, either metal or plastic, but most desirably plastic, such as polyethylene or polypropylene. As is conventional, cap 26 has a top wall 40 and an internally threaded downwardly depending circular side wall 42. The exterior surface of circular side wall 42 can be knurled or provided with vertically extending ridges and/or grooves to assist the consumer in grasping cap 26 when screwing it onto or off of container 28. Cap 26 is then placed over the opening of container 28 and tightened to the container. Innerseal 20 is then sealed to lip 30 by means of heating, such as, for example, induction heating.

The sheet material of the present invention can also be used to form sealing membranes for containers where no cap is used. Such sealing membranes are described, for example, in U.S. Pat. No. 4,264,316, incorporated herein by reference.

The following examples serve to further illustrate the invention and should not be construed to limit the invention.

EXAMPLE 1

An innerseal was made from a sheet material consisting of a 0.004 inch (0.102 mm.) thick "Valeron" film laminated by means of "Adcote" 503A adhesive to a first major surface of a 0.001 inch (0.025 mm) thick aluminum foil. The dry coating weight of the layer of adhesive was about one grain per 24 square inches (83.7 mg per 200 sq. cm). The second major surface of the aluminum foil was laminated to the polyester side of a "Scotchpak" 115 film by means of "Adcote" 503A adhesive. The other side of the "Scotchpak" 115 film was formed from an ethylene-vinyl acetate copolymer. The dry coating weight of this layer of adhesive was about one grain per 24 square inches (83.7 mg. per 200 sq. cm). This sheet material can be used as an innerseal for containers made from polyethylene or polypropylene.

EXAMPLE 2

A 0.001 inch (0.025 mm.) thick white, opaque, polyester film was laminated to the exposed side of the "Valeron" film of the innerseal from Example 1 by means of "Adcote" 503A adhesive. The dry coating weight of the layer of adhesive was about one grain per 24 square inches (83.7 mg per 200 sq. cm). One such polyester film is described in U.S. Pat. No. 3,154,461. The polyester film provides not only an aesthetically pleasing surface but also additional reinforcement to the innerseal.

EXAMPLE 3

An innerseal was made from a sheet material consisting of a 0.004 inch (0.102 mm.) thick "Valeron" film laminated to a first major surface of a 0.001 inch thick (0.0254 mm) aluminum foil by means of "Adcote" 503A adhesive. The dry coating weight of the layer of adhesive was about one grain per 24 square inches (83.7 mg per 200 sq. cm). The second major surface of the aluminum foil was laminated to the polyester side of a "Mylar" 50 XM946 film by means of "Adcote" 503A adhesive. The other side of the "Mylar" 50 XM946 film was formed from an ethylene-vinyl acetate copolymer. The dry coating weight of the layer of adhesive was about one grain per 24 square inches (83.7 mg per 200 sq. cm). This sheet material can be used as an innerseal for containers made from polypropylene, polyethylene, polyester, poly(vinyl chloride), and polystyrene.

EXAMPLE 4

The exposed side of the "Valeron" film of the innerseal from Example 3 was laminated to a 0.001 inch (0.025 mm) thick white, opaque, polyester film as described in Example 2 by means of "Adcote" 503A adhesive. The dry coating weight of the layer of adhesive was about one grain per 24 square inches (83.7 mg per 200 sq. cm).

EXAMPLE 5

An innerseal was made from a sheet material consisting of a 0.004 inch (0.102 mm) thick "Valeron" film laminated to a first major surface of a 0.001 inch (0.025 mm) thick aluminum foil by means of "Adcote" 503A adhesive. The dry coating weight of the layer of adhesive was about one grain per 24 square inches (83.7 mg per 200 sq. cm). The second major surface of the aluminum foil was laminated to the polyester side of a "Mylar" 50 OL-2 film by means of "Adcote" 503A adhesive. The other side of the "Mylar" 50 OL-2 film was formed from a layer of heat-sealable material. The dry coating weight of the layer of adhesive was about one grain per 24 square inches (83.7 mg per 200 sq. cm). This sheet material can be used as an innerseal for containers made from polyester or poly(vinyl chloride).

The innerseals were tested to determine tear resistance, tear propagation resistance, and springback angle. The results of the tests are set forth in Table I. A commercially available innerseal material was used as the control.

The following test methods were used to evaluate the innerseal of this invention.

Amount of Tab Springback After Folding

A tabbed innerseal having a circular body 1.125 inches (2.86 cm) in diameter and a tab measuring 0.25 inch (0.635 cm) wide by 0.1875 inch (0.476 cm) long is cut from a reinforced sheet. The tip of the tab is rounded. A perspective view of the tabbed innerseal is shown in FIG. 2.

Figure 4B:
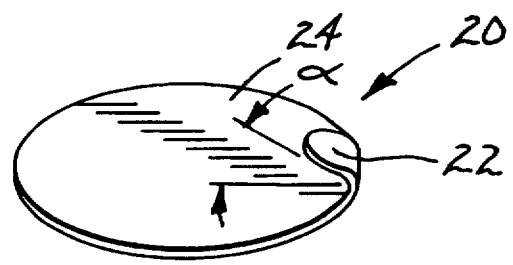
FIG. 4B is a perspective view of the embodiment of FIG. 4A in which the tab has sprung back to an angle having a value of less than 45°.

The tab is folded back 180° so that it contacts the surface of the innerseal opposite the heat sealing layer and rolled once with a 3.25 inch diameter steel roller weighing 4.5 pounds. The roller is described in ASTM D-3330-83. A perspective view of the tabbed innerseal after the tab is folded and rolled is shown in FIG. 4A. The amount of springback is measured by means of a protractor. A perspective view of the tabbed innerseal after the tab has been folded and rolled, and has then sprung back at an angel ($\alpha$) of less than 45°, is shown in FIG. 4B.

Tear Resistance Test (ASTM-D 1922-67, Reapproved 1986)

This test measures the amount of force required to tear a film in which a tear has already been started by making a small slit on the edge of the film with a knife. The test provides an indication of the tearing resistance of a film.

Tear Propagation Resistance Test (ASTM-D 1938-85)

This test measures the amount of force required to start a tear in a plastic film and is a measure of the resistance to tear propagation in a film that has not been cut initially.

TABLE I

| Sample | Tear resistance (grams) | | Tear propagation resistance (grams) | | Springback angle (degrees) |
|---|---|---|---|---|---|
| | MD* | CD** | MD* | CD** | |
| Example 2 | 2175 | 2195 | 3853 | 9632 | 31.6 |
| Example 4 | 2293 | 2156 | 4128 | 9013 | 29.5 |
| Control+ | 390 | 470 | 1651 | 2201 | 92.6 |

*Machine direction or lengthwise direction of the film as it is made
**Cross-direction or the direction perpendicular to the lengthwise direction of the film as it is made
+Insulec, U-5, commercially available innerseal material from Insulec, Ltd, Aurora, Ontario, Canada The data in Table I show that the innerseals of the present invention are greatly superior to the commercially available control innerseal with respect to the three properties tested.

The innerseals were further tested in the following manner. Innerseals (38 mm diameter) having tabs were die-cut from the sheets of Examples 2 and 4. The tab was folded so that the polyester surface of the tab contacted the polyester surface of the portion of the innerseal that would cover the mouth of the container. Each innerseal was placed in a polypropylene continuous thread cap with the polyester surface of the innerseal facing the top of the cap. The cap was then positioned on an 8 ounce (237 ml) capacity polyethylene bottle. The bottle had been previously filled with 8 ounces (237 ml) of water. The cap was then tightened to 17 inch-pounds (196 gram-meters) with a spring torque tester available from Owens Illinois Glass Company, Toledo, Ohio. The innerseal was bonded to the bottle by means of a "Lepel" high frequency induction unit Model No. T-2.5-1-KC-AP-BW having a 38 mm tunnel coil at a speed of 60 feet per minute. The power setting of the unit, expressed as a percentage of the maximum, was varied and the power setting range capable of providing adequate sealing is shown in Table II. The minimum value shows the lowest setting at which an adequate seal can be obtained. The maximum value shows the value at which the innerseal can still be removed in one piece by the user. Higher power settings will still provide an adequate seal but one in which the innerseals are very difficult to remove. The innerseal can also be scorched at high power settings, resulting in a poor appearance.

The sealing test involves placing a water-filled container, with the threaded cap removed, on its side in a vacuum chamber pumped to a vacuum of about 25 inches of mercury gage pressure. (A reading of 0 on the gage indicates atmospheric pressure; as the gage reading increases, the amount of vacuum also increases.) In order for a seal to be deemed adequate, it must have remained adhered to the container in a vacuum of at least 16 inches of mercury.

TABLE II

| Example | Adequate sealing range (% induction power) |
|---|---|
| 2 | 70–82 |
| 4 | 71–85 |
| Control | 70–82 |

The data in TABLE II show that the innerseals of the present invention can be applied by means of conventional container sealing equipment.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An innerseal having a tab extending from the outer periphery of the innerseal comprising:
   (a) a layer of sealing material for bonding said innerseal to a container;
   (b) a layer of material substantially impermeable to air and moisture; and
   (c) a reinforcing layer comprising at least two plies of monoaxially oriented film combined in lamination with the strong direction of at least one ply crossing the weak direction of another ply, said reinforcing layer having a thickness form about 0.05 mm to about 0.30 mm, said tab having a springback angle, which springback angle is determined by folding said tab back 180° so that it contacts the surface of said innerseal opposite said layer of sealing material and measuring the amount of springback of said tab by means of a protractor, wherein the springback angle of said tab has a maximum value of about 45°.

2. The innerseal of claim 1, wherein said impermeable layer is disposed between said layer of sealing material and said reinforcing layer.

3. The innerseal of claim 1, wherein said reinforcing layer is disposed between said impermeable layer and said layer of sealing material.

4. The innerseal of claim 1, wherein at least one ply of said monoaxially oriented film is made of a polymer that is a member of the group consisting of homo- and copolymers of ethylene, polypropylene, polystyrene, poly(vinyl chloride), polyvinylidene chloride, polyvinyl alcohol, ethylene/vinyl acetate copolymers, and polyesters.

5. The innerseal of claim 1, further including a fourth layer.

6. A container having a cap and an innerseal having a tab, said innerseal comprising:
   (a) a layer of sealing material for bonding said innerseal to said container;
   (b) a layer of material substantially impermeable to air and moisture; and
   (c) a reinforcing layer comprising at least two plies of monoaxially oriented film combined in lamination with the strong direction of at least one ply crossing the weak direction of another ply, said reinforcing layer having a thickness from about 0.05 mm to about 0.30 mm, said tab having a springback angle, which springback angle is determined by folding said tab back 180° so that it contacts the surface of said innerseal opposite said layer of sealing material and measuring the amount of springback of said tab by means of a protractor, wherein the springback angle of said tab has a maximum value of about 45°.

7. The container of claim 6, wherein said impermeable layer is disposed between said layer of sealing material and said reinforcing layer.

8. The container of claim 6, wherein said reinforcing layer is disposed between said impermeable layer and said layer of sealing material.

9. The container of claim 6, wherein at least one ply of said monoaxially oriented film is made of a polymer that is a member of the group consisting of homo- and co-polymers of ethylene, polypropylene, polystyrene, poly(vinyl chloride), polyvinylidene chloride, polyvinyl alcohol, ethylene/vinyl acetate copolymers, and polyesters.

10. The container of claim 6, further including a fourth layer.

* * * * *

UNITED STATES PATENT AND TRADEMARK OFFICE
CERTIFICATE OF CORRECTION

PATENT NO. : 5,372,268
DATED : December 13, 1994
INVENTOR(S) : Han

It is certified that error appears in the above-identified patent and that said Letters Patent is hereby corrected as shown below:

Col. 3, line 11      should include the following information

Figure 5:
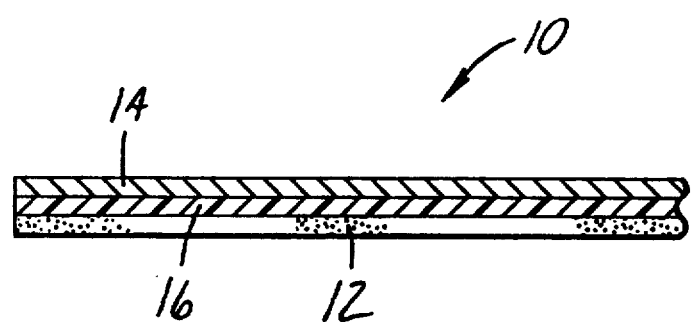

--FIG. 5 is a greatly enlarged, schematic, cross-sectional view of a standard material from which an innerseal or sealing membrane can be formed. In this embodiment, the layer of reinforcing material is disposed between the sealing layer and the impermeable layer.

FIG. 6 is a greatly enlarged, schematic, cross-sectional view of a standard material from which an innerseal or sealing membrane can be formed. In this embodiment, the material of FIG. 1 further includes a fourth layer that overlies the layer of reinforcing material. --

Signed and Sealed this

Second Day of May, 1995

Attest:

BRUCE LEHMAN

*Attesting Officer*      *Commissioner of Patents and Trademarks*